United States Patent
Sugimura et al.

(10) Patent No.: US 10,097,740 B2
(45) Date of Patent: Oct. 9, 2018

(54) IN-VEHICLE CAMERA

(71) Applicant: JVC KENWOOD CORPORATION, Yokohama-shi, Kanagawa (JP)

(72) Inventors: Yukio Sugimura, Yokohama (JP); Yoji Sasaki, Yokohama (JP); Tsuyoshi Okunishi, Yokohama (JP); Seiji Shinohara, Yokohama (JP); Takao Sekine, Yokohama (JP); Satoshi Negami, Yokohama (JP); Fumio Tsukamoto, Yokohama (JP); Hirofumi Yamamoto, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 285 days.

(21) Appl. No.: 14/991,450

(22) Filed: Jan. 8, 2016

(65) Prior Publication Data
US 2016/0119514 A1  Apr. 28, 2016

Related U.S. Application Data

(63) Continuation of application No. PCT/JP2014/070431, filed on Aug. 4, 2014.

(30) Foreign Application Priority Data

Sep. 19, 2013 (JP) .................... 2013-193677

(51) Int. Cl.
H04N 5/225 (2006.01)
G03B 17/55 (2006.01)
(Continued)

(52) U.S. Cl.
CPC ........... *H04N 5/2252* (2013.01); *B60R 11/04* (2013.01); *B60R 25/305* (2013.01); *G03B 17/02* (2013.01);
(Continued)

(58) Field of Classification Search
CPC .. H04N 5/2252; G06K 9/00791; G03B 17/55; B60R 25/305
(Continued)

(56) References Cited

U.S. PATENT DOCUMENTS 9,338,334 B2 *  5/2016  Lu ........................... G02B 7/025
2002/0003571 A1 *  1/2002  Schofield ................ B60C 23/00
                                                    348/148

(Continued)

FOREIGN PATENT DOCUMENTS

JP    2008-118482 A    5/2006
JP    2007-6394 A      1/2007
(Continued)

*Primary Examiner* — Andy Rao
*Assistant Examiner* — Zaihan Jiang
(74) *Attorney, Agent, or Firm* — Nath, Goldberg & Meyer; Jerald L. Meyer; Stanley N. Protigal

(57) ABSTRACT

A front imaging portion captures the front side of a vehicle. A rear imaging portion captures the interior or the rear side of the vehicle. A casing houses the front imaging portion and the rear imaging portion. A heat sink is located between the front imaging portion and the rear imaging portion in the casing to radiate heat inside the casing. A fixing portion is located on the outer surface of the casing and between a first end and a second end of the heat sink and separated from the heat sink to fix the casing to the vehicle. An intake is located adjacent to the fixing portion at the first end to be open toward the heat sink. An outlet is located adjacent to the fixing portion at the second end to be open toward the heat sink while facing the intake with the fixing portion interposed therebetween.

3 Claims, 16 Drawing Sheets

(51) Int. Cl.
  *B60R 25/30* (2013.01)
  *G06K 9/00* (2006.01)
  *G03B 17/02* (2006.01)
  *G03B 17/56* (2006.01)
  *B60R 11/04* (2006.01)
  *B60R 11/00* (2006.01)

(52) U.S. Cl.
  CPC ........... *G03B 17/55* (2013.01); *G03B 17/561* (2013.01); *G06K 9/00791* (2013.01); *H04N 5/225* (2013.01); *B60R 2011/0026* (2013.01); *B60R 2011/0033* (2013.01)

(58) Field of Classification Search
  USPC ........................................................ 348/148
  See application file for complete search history.

(56) References Cited

U.S. PATENT DOCUMENTS

| | | | | |
|---|---|---|---|---|
| 2009/0295181 A1* | 12/2009 | Lawlor | ................... | B60R 1/12 296/1.11 |
| 2010/0265328 A1 | 10/2010 | Chou | | |
| 2012/0140080 A1* | 6/2012 | Taylor | ................. | B60C 23/0408 348/148 |
| 2014/0178031 A1* | 6/2014 | Walker | ..................... | H04N 9/79 386/227 |
| 2014/0354878 A1* | 12/2014 | Winter | ................. | H04N 5/2252 348/374 |
| 2015/0015713 A1* | 1/2015 | Wang | ..................... | H04N 7/18 348/148 |
| 2015/0042798 A1* | 2/2015 | Takeda | ................. | H04N 5/2252 348/148 |
| 2016/0229415 A1* | 8/2016 | Laakmann | ......... | G06K 9/00791 |

FOREIGN PATENT DOCUMENTS

| | | |
|---|---|---|
| JP | 2007-15457 A | 1/2007 |
| JP | 2011-246056 A | 12/2011 |
| JP | 2012-204983 A | 10/2012 |

* cited by examiner

IN-VEHICLE CAMERA

CROSS REFERENCE TO RELATED APPLICATION

This application is a Continuation of PCT Application No. PCT/JP2014/070431, filed on Aug. 4, 2014, and claims the priority of Japanese Patent Application No. 2013-193677, filed on Sep. 19, 2013, the entire contents of all of which are incorporated herein by reference.

BACKGROUND

The present disclosure relates to an in-vehicle camera.

Drive recorders for recording outer peripheries in front of vehicles or the inside of the vehicles have come into widespread use. Japanese Unexamined Patent Application Publication No. 2008-118482 discloses an in-vehicle camera, for drive recording installed in a vehicle and capable of recording the inside and the outside of the vehicle.

Temperature inside vehicles tends to be extremely high. In-vehicle cameras are installed adjacent to windshields and therefore irradiated with almost direct sunlight. Thus, the in-vehicle cameras are required to operate under high-temperature conditions. Japanese Unexamined Patent Application Publication No. 2007-015457 discloses that an increase in temperature of an in-vehicle camera is suppressed by use of a heat-blocking material.

SUMMARY

In association with an increasing demand for high definition imaging, in-vehicle cameras are required to capture objects outside or inside vehicles with full HD quality. The in-vehicle cameras should have resistance to the use at high temperatures such as 85° C. in order that the full HD in-vehicle cameras for capturing objects can operate properly. However, the conventional in-vehicle cameras cannot endure being used under such high temperatures.

An aspect of the embodiments provides an in-vehicle camera including: a front imaging portion configured to capture a front side of a vehicle; a rear imaging portion configured to capture an interior or a rear side of the vehicle; a casing housing the front imaging portion and the rear imaging portion; a heat sink located between the front imaging portion and the rear imaging portion in the casing to radiate heat inside the casing; a fixing portion located on an outer surface of the casing and between a first end and a second end of the heat sink and separated from the heat sink to fix the casing to the vehicle; an intake located adjacent to the fixing portion at the first end of the heat sink to be open toward the heat sink; and an outlet located adjacent to the fixing portion at the second end of the heat sink to be open toward the heat sink while facing the intake with the fixing portion interposed therebetween.

DETAILED DESCRIPTION

Hereinafter, in-vehicle cameras according to the respective embodiments will be explained with reference to appended drawings. The in-vehicle cameras according to the respective embodiments may be either drive recorders having recording and reproducing functions or imaging devices, without recording or reproducing functions.

When the in-vehicle cameras according to the respective embodiments are imaging devices without recording or reproducing functions, captures obtained by the in-vehicle cameras may be transmitted to and displayed on a display or may be transmitted to and recorded on an external drive recorder.

First Embodiment

An in-vehicle camera 101 according to the first embodiment is explained below with reference to FIG. 1 to FIG. 5. The first embodiment provides the in-vehicle camera 101 capable of properly operating under high-temperature conditions.

Figure 1:
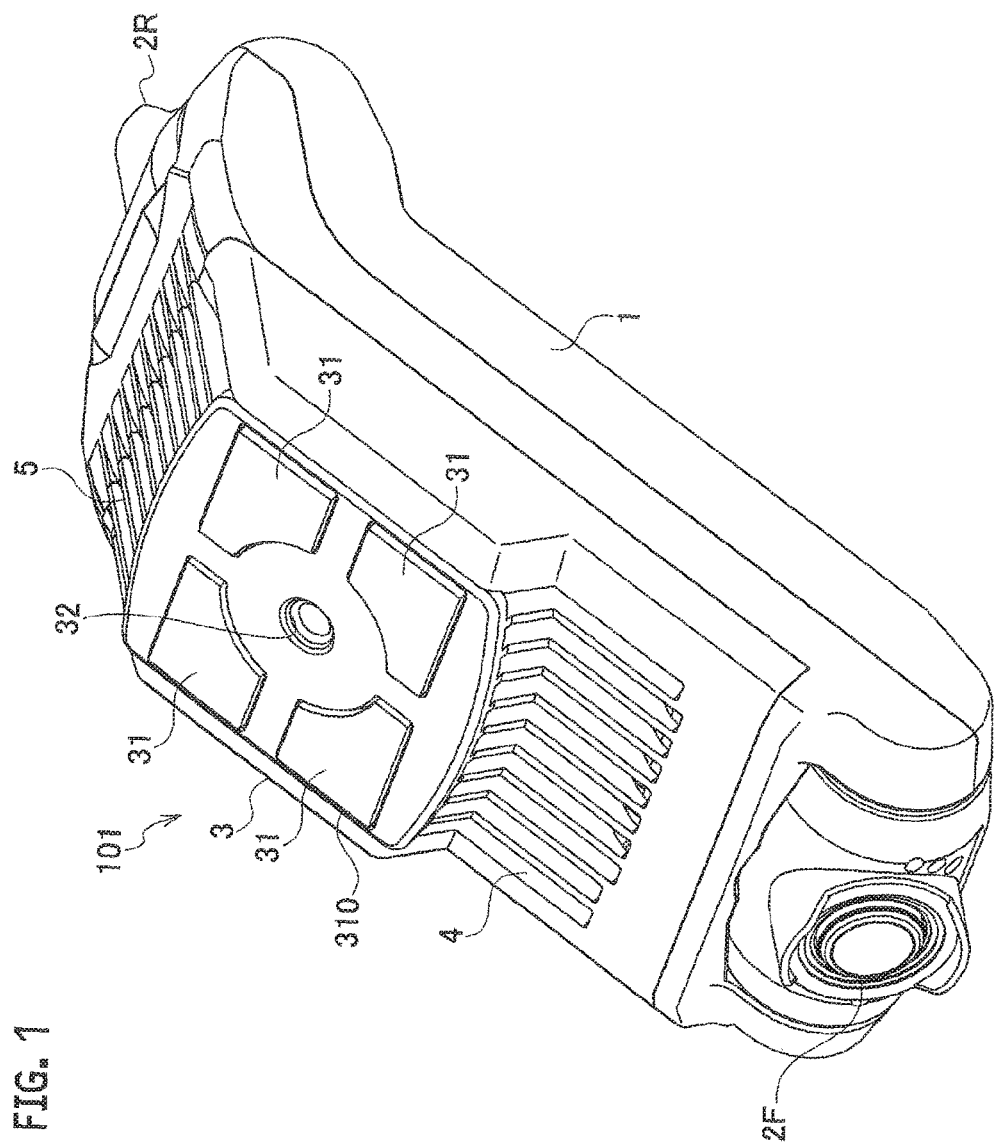
FIG. 1 is a perspective view of an in-vehicle camera on the upper side according to the first embodiment.
Figure 2:
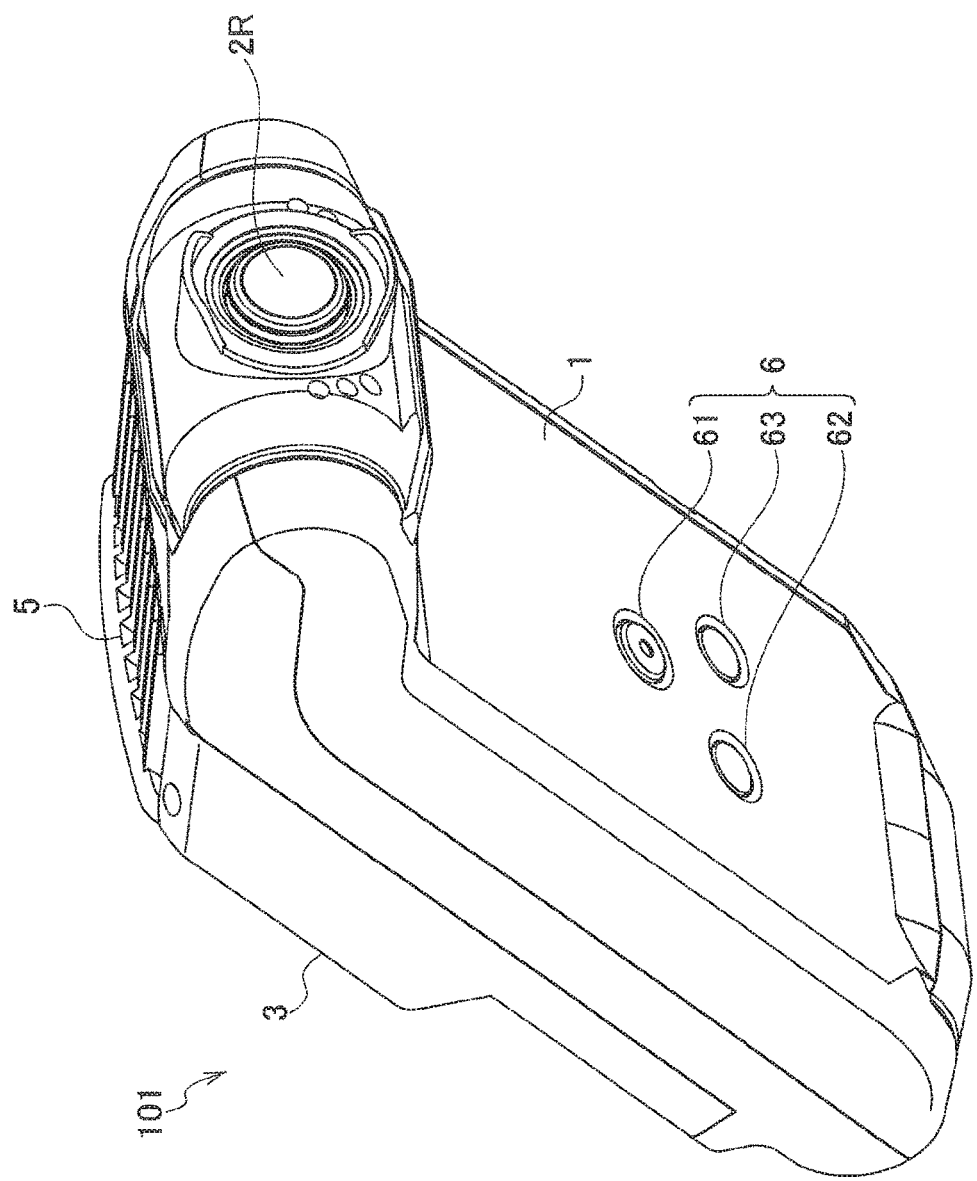
FIG. 2 is a perspective view of the in-vehicle camera on the rear side according to the first embodiment.

As shown in FIG. 1 and FIG. 2, the in-vehicle camera 101 includes a front imaging portion 2F located at one end (a first end) of a casing 1 to capture the front side of a vehicle, and a rear imaging portion 2R located at the other end (a second end) of the casing 1 to capture the rear of the in-vehicle camera 101. The rear imaging portion 2R mainly captures the interior of the vehicle. The rear imaging portion 2R may capture the rear side of the vehicle.

As shown in FIG. 1, a protrusion 3 is formed on the top surface of the casing 1. The protrusion 3 is provided with double-sided adhesive tape 31 with which the in-vehicle camera 101 is put on the inner surface of a windshield of the vehicle. The protrusion 3 is an example of an outer surface configuration on the upper side of the casing 1. In the example shown in FIG. 1, the four pieces of double-sided adhesive tape 31 constitute a fixing portion 310 adhering to the windshield.

The fixing portion 310 fixes the casing 1 to a predetermined position in the vehicle in a manner such that the casing 1 is located in a space between the windshield and a rearview mirror in the vehicle.

The protrusion 3 is provided, in the middle thereof, with a screw hole 32 for holding a tripod. The four pieces of double-sided adhesive tape 31 are arranged to surround the screw hole 32. The fixing portion 310 is not limited to the double-sided adhesive tape 31. The fixing portion 310 is only required to fix the in-vehicle camera 101 on the inner surface of the windshield and may be a suction cup.

An intake 4 is formed on the upper surface of the casing 1 in front of the fixing portion 310 toward the front imaging portion 2F. An outlet 5 is formed on the upper surface of the casing 1 behind the fixing portion 310 toward the rear imaging portion 2R.

As shown in FIG. 2, a plurality operation buttons 6 is provided on the lower surface of the casing 1 facing the anterior of the vehicle. The operation buttons 6 include, for example, a recording start button 61 to start recording, a setting button 62 for a wireless LAN, and a selection button 63 to select modes. The positions of the operation buttons 6 are not limited to those shown in FIG. 2.

Figure 3:
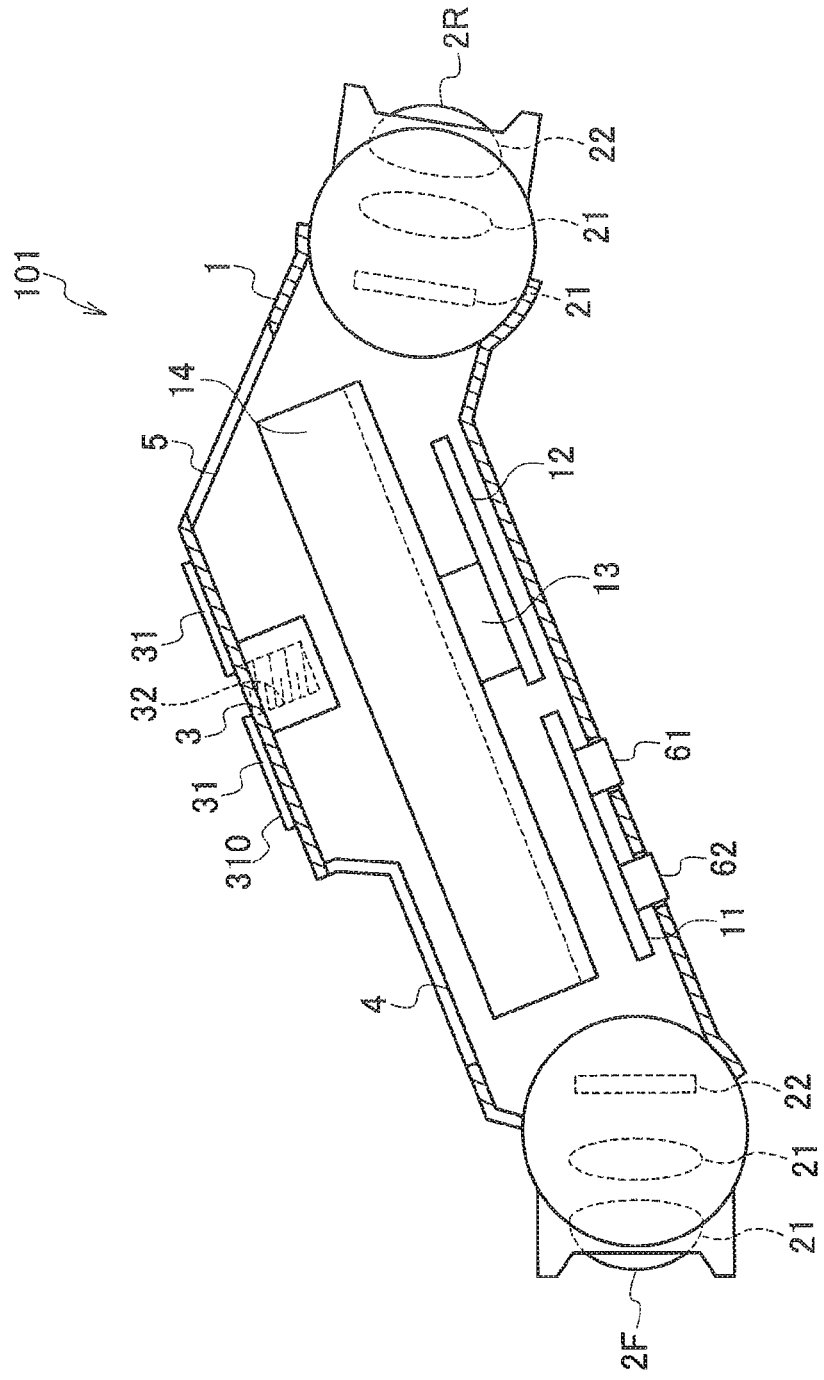
FIG. 3 is a side view showing part of the in-vehicle camera in cross section according to the first embodiment.

Next, a schematic internal configuration of the in-vehicle camera 101 is explained below with reference to FIG. 3. FIG. 3 is a schematic cross-sectional view showing the inside of the casing 1 as viewed from one side. The casing 1 houses boards 11, 12 and a heat sink 14, in addition to the front imaging portion 2F and the rear imaging portion 2R. The front imaging portion 2F and the rear imaging portion 2R each include a plurality of lenses 21 and an imaging element 22. An integrated circuit 13 is mounted on the board 12.

The heat sink is located above the boards 11, 12. The integrated circuit 13 is in contact with the lower surface of the heat sink 14 so that heat generated in the integrated circuit 13 is transmitted to the heat sink 14. A plurality of fins in the heat sink 14 is aligned in a direction perpendicular to the sheet of FIG. 3.

As shown in FIG. 3, the fixing portion 310 is located between one end of the heat sink 14 toward the front imaging portion 2F and the other end toward the rear imaging portion 2R. The fixing portion 310 is interposed between the intake 4 and the outlet 5. The intake 4 is located at one end of the heat sink 14. The outlet 5 is located at the other end of the heat sink 14 in such a manner as to face the intake 4 with the fixing portion 310 interposed therebetween.

Figure 4:
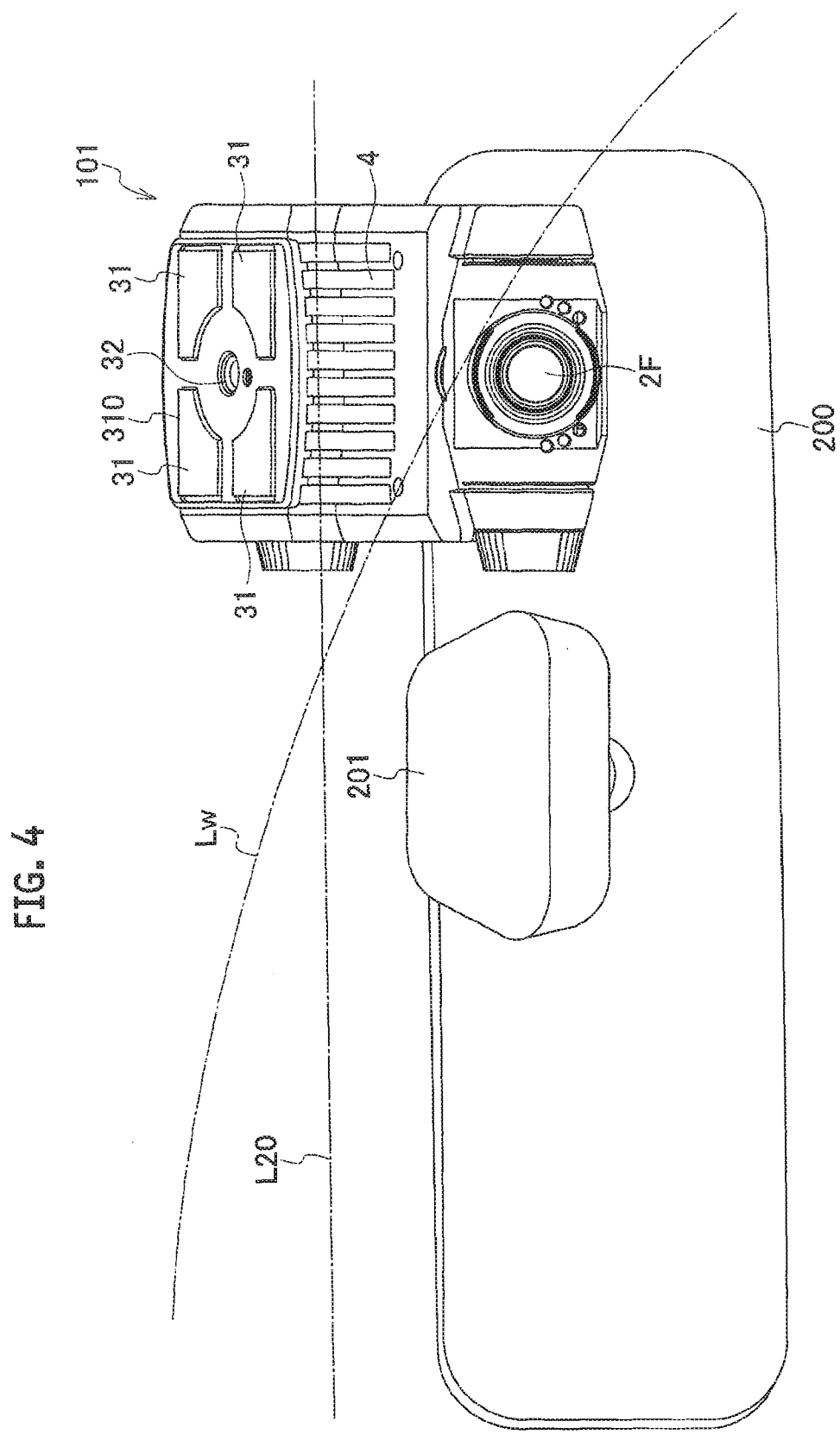
FIG. 4 is a front view of the in-vehicle camera according to the first embodiment installed in a vehicle as viewed from the outside toward the inside of the vehicle.

The in-vehicle camera 101 configured as described above is attached to the inner surface of the windshield as shown in FIG. 4. FIG. 4 is a front view showing part of the windshield as viewed from the outside toward the inside of the vehicle.

FIG. 4 is illustrated with an example in which a base 201 of a rearview mirror 200 is fixed to the inner surface of the windshield. The rearview mirror 200 may be fixed to other areas in the vehicle other than the windshield. The region to which the in-vehicle camera 101 can be attached in the windshield is restricted within 20% in the upper portion of the windshield as established by law.

The region within 20% from the upper end of the windshield is indicated by dashed-and-dotted line L20 in the drawing. As shown in FIG. 4, the in-vehicle camera 101 is attached in a manner such that the fixing portion 310 is located above the dashed-and-dotted line L20.

In FIG. 4, the uppermost position where a wiper can reach for cleaning the surface of the windshield is indicated by dashed-and-dotted line Lw. If the lenses of the front imaging portion 2F are located in the region above the dashed-and-dotted line Lw where the wiper cannot reach, preferred captures may not be obtained because of raindrops or dust adhering to the windshield. Thus, the in-vehicle camera 101 is attached in a manner such that the lenses of the front imaging portion 2F are located below the dashed-and-dotted line Lw.

Figure 5:
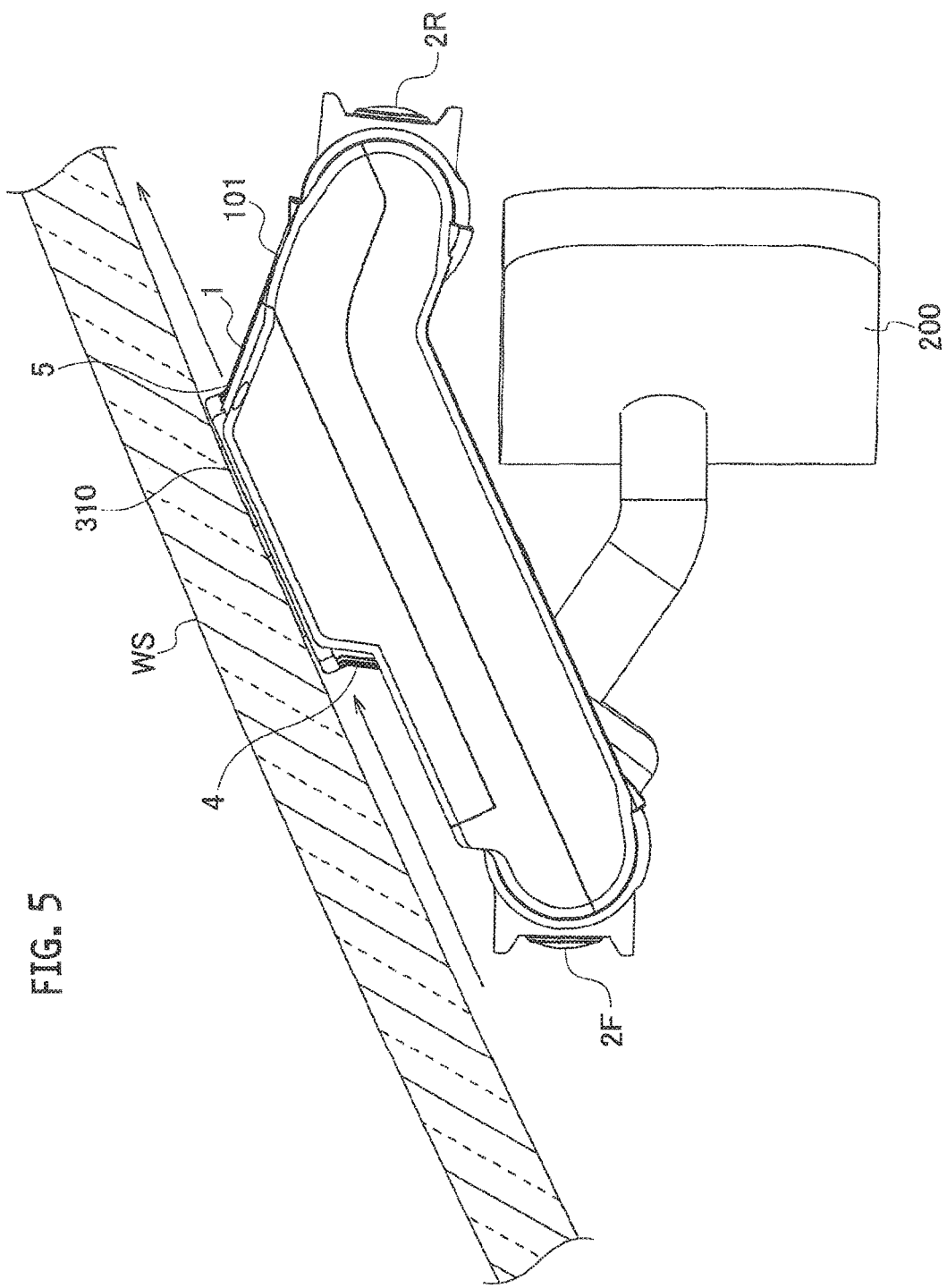
FIG. 5 is a side view of the in-vehicle camera according to the first embodiment installed in the vehicle.

FIG. 5 is a side view showing the in-vehicle camera 101 attached on the inner surface of the windshield WS at the position explained with reference to FIG. 4. FIG. 5 shows a cross section of the windshield WS at the position where the in-vehicle camera 101 is attached. An airflow generated by an air conditioner of the vehicle enters the intake 4, passes through the casing 1 and is then discharged to the outside of the casing 1 from the outlet 5, as indicated by the arrow in the drawing. Accordingly, the heat sink 14 is cooled.

The heat generated in the integrated circuit 13 or the boards 11, 12 in the casing 1 is transmitted to the heat sink 14. The heat sink 14 is cooled by the airflow generated by the air conditioner so that the in-vehicle camera 101 is cooled. Note that, since the heat sink 14 radiates heat even when no airflow is generated by the air conditioner, the in-vehicle camera 101 is cooled, although the cooling efficiency decreases.

The in-vehicle camera 101 according to the first embodiment has an inner configuration contributing to high cooling efficiency so as to endure being used at a high temperature of 85° C. Accordingly, the in-vehicle camera 101 can properly operate to capture objects with full HD quality.

Second Embodiment

An in-vehicle camera 102 according to a second embodiment is explained below with reference to FIG. 6 to FIG. 12. There is another problem that installation of an in-vehicle camera is limited depending on the type of vehicle. The second embodiment provides the in-vehicle camera 102 which can be installed in any type of vehicle. The same elements in FIG. 6 to FIG. 12 as those in FIG. 1 to FIG. 5 are indicated by the same reference numerals, and overlapping explanations thereof are not repeated below.

The in-vehicle camera 102 may have a particular configuration described below in addition to the configuration of the in-vehicle camera 101 according to the first embodiment. The in-vehicle camera 102 may have a particular configuration described below instead of having the configuration of the in-vehicle camera 101 according to the first embodiment.

Figure 6:
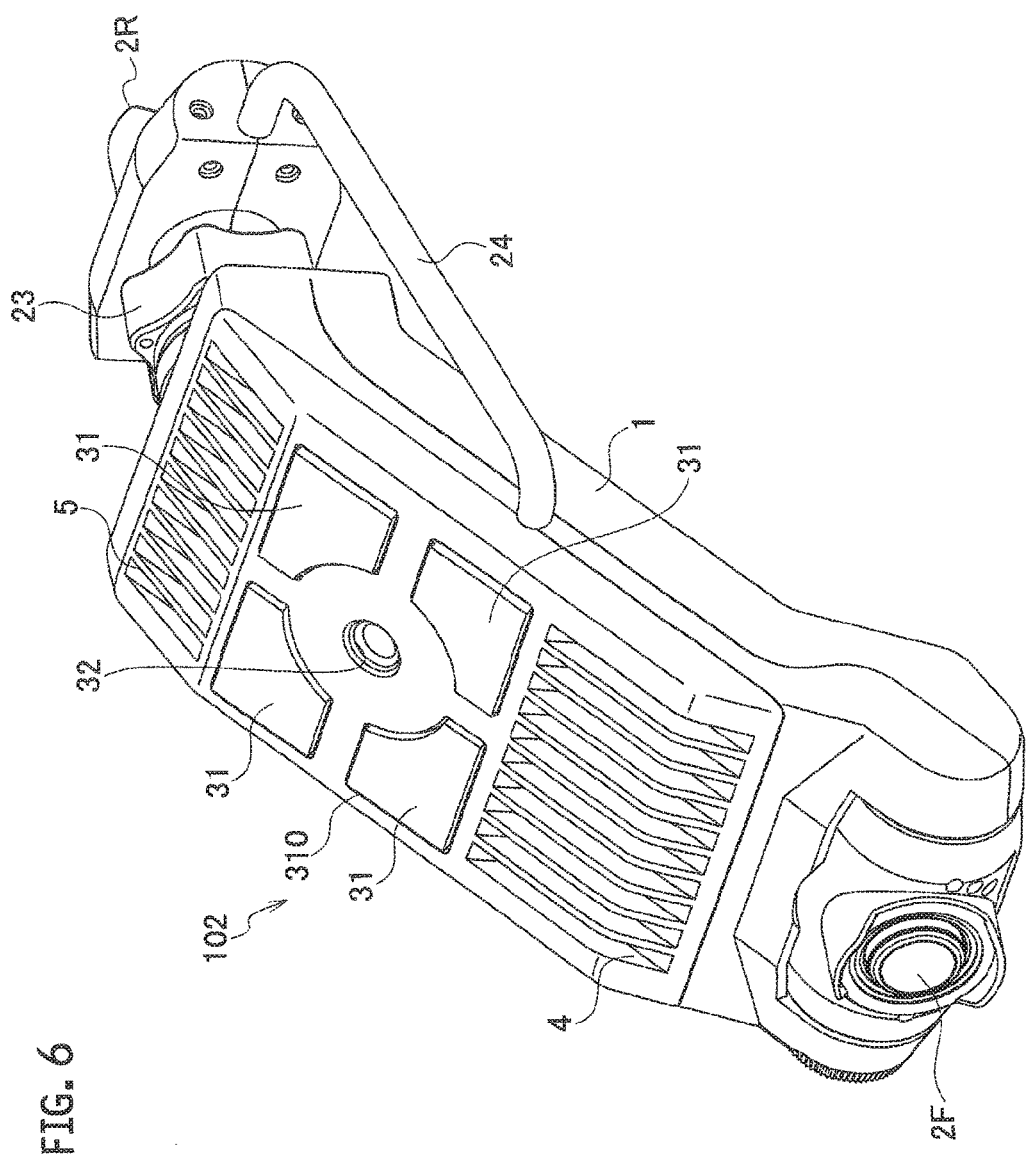
FIG. 6 is a perspective view of an in-vehicle camera on the upper side according to the second embodiment.
Figure 7:
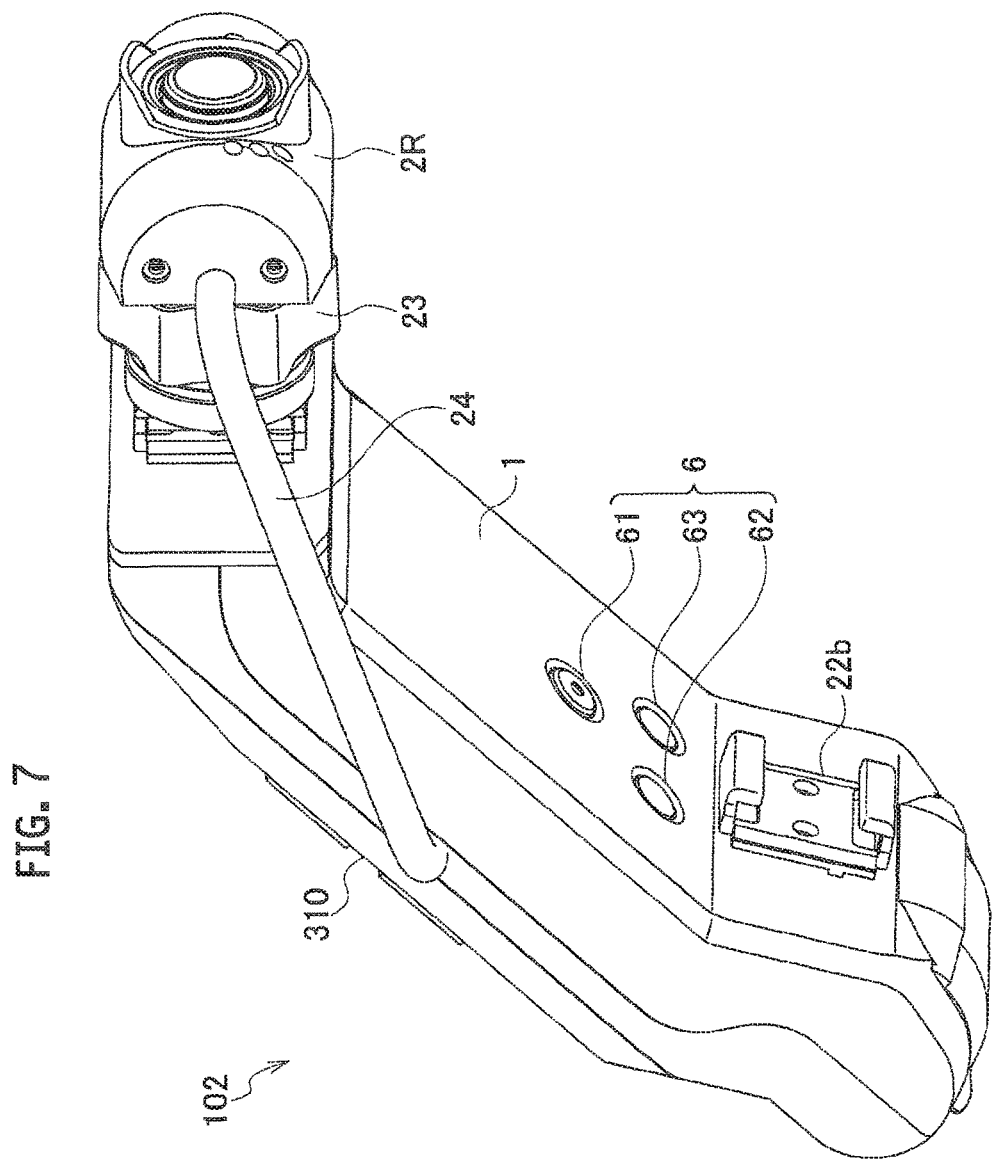
FIG. 7 is a perspective view of the in-vehicle camera according to the second embodiment showing a first state on the rear side.
Figure 8:
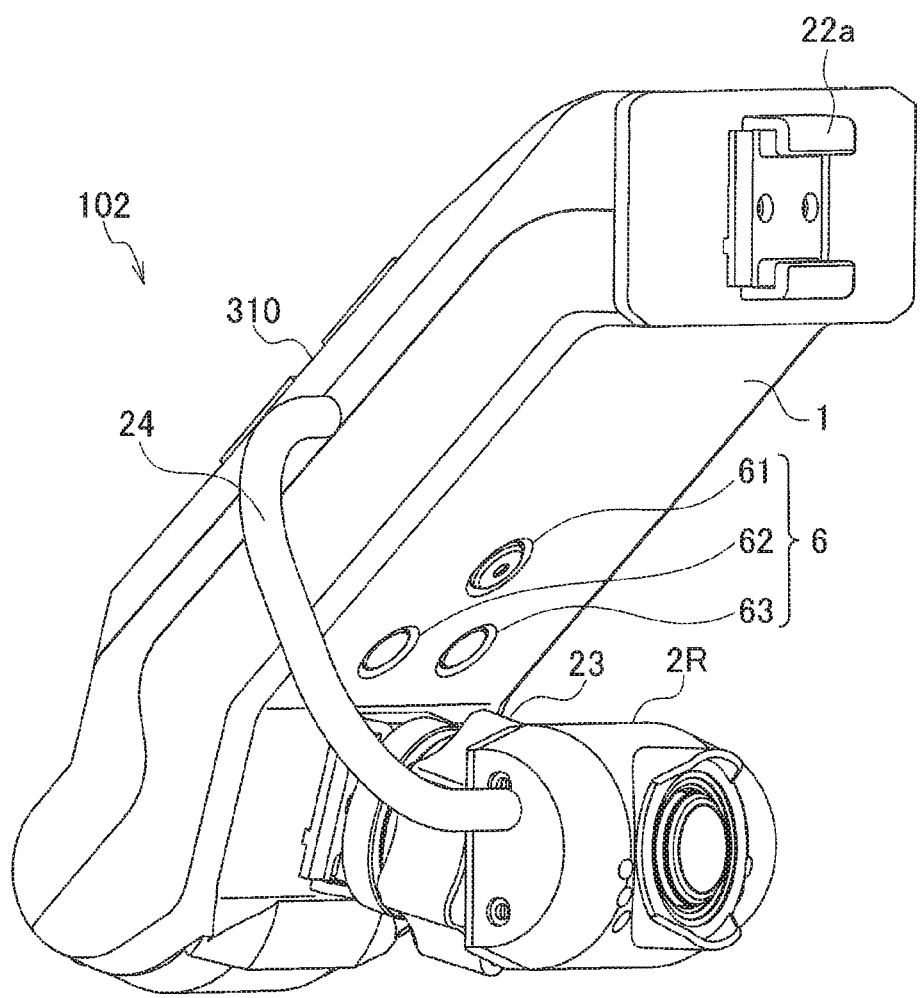
FIG. 8 is a perspective view of the in-vehicle camera according to the second embodiment showing a second state on the rear side.

As shown in FIG. 6, the in-vehicle camera 102 includes the front imaging portion 2F located at one end of the casing 1 to capture the front side of the vehicle and the rear imaging portion 2R to capture the rear of the in-vehicle camera 102. The in-vehicle camera 102 includes an attachment 22a, as shown in FIG. 8, for attaching the rear imaging portion 2R to the other end of the casing 1 and an attachment 22b, as shown in FIG. 7, for attaching the rear imaging portion 2R adjacent to the front imaging portion 2F.

The respective attachments 22a and 22b are positioned at different heights in a state where the in-vehicle camera 102 is attached at a predetermined position in the vehicle.

The rear imaging portion 2R of the in-vehicle camera 102 is detachably connected to the casing 1. The in-vehicle camera 102 can be switched between a state where the rear imaging portion 2R is attached to the attachment 22a as shown in FIG. 7 and a state where the rear imaging portion 2R is attached to the attachment 22b as shown in FIG. 8.

The circuit mounted on the board 12 and the rear imaging portion 2R are connected to each other via a cable 24. A fixing part 23 fixes the rear imaging portion 2R to the attachments 22a or 22b rigidly to prevent the rear imaging portion 2R attached to the attachments 22a or 22b from dropping therefrom.

Figure 9:
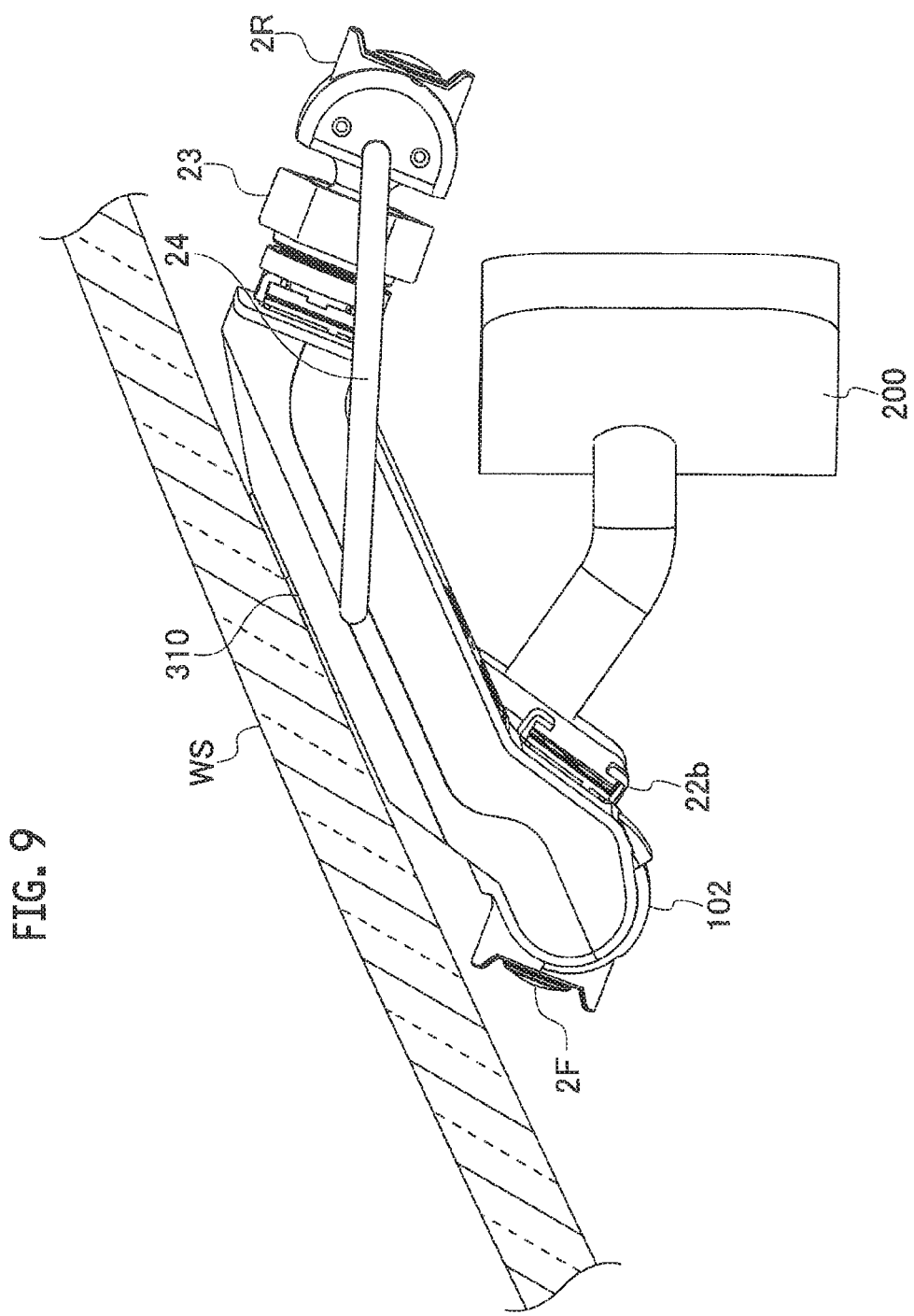
FIG. 9 is a side view of the in-vehicle camera according to the second embodiment installed in the vehicle in the first state.

The in-vehicle camera 102 is in the state shown in FIG. 6 and FIG. 7 when attached to a vehicle in which a region between the rearview mirror 200 and a roof of the vehicle is wide. As shown in FIG. 9, the in-vehicle camera 102 is fixed to the inner surface of the windshield WS with the fixing portion 310. FIG. 9 shows a cross section of the windshield WS at the position where the in-vehicle camera 102 is attached.

Figure 10:
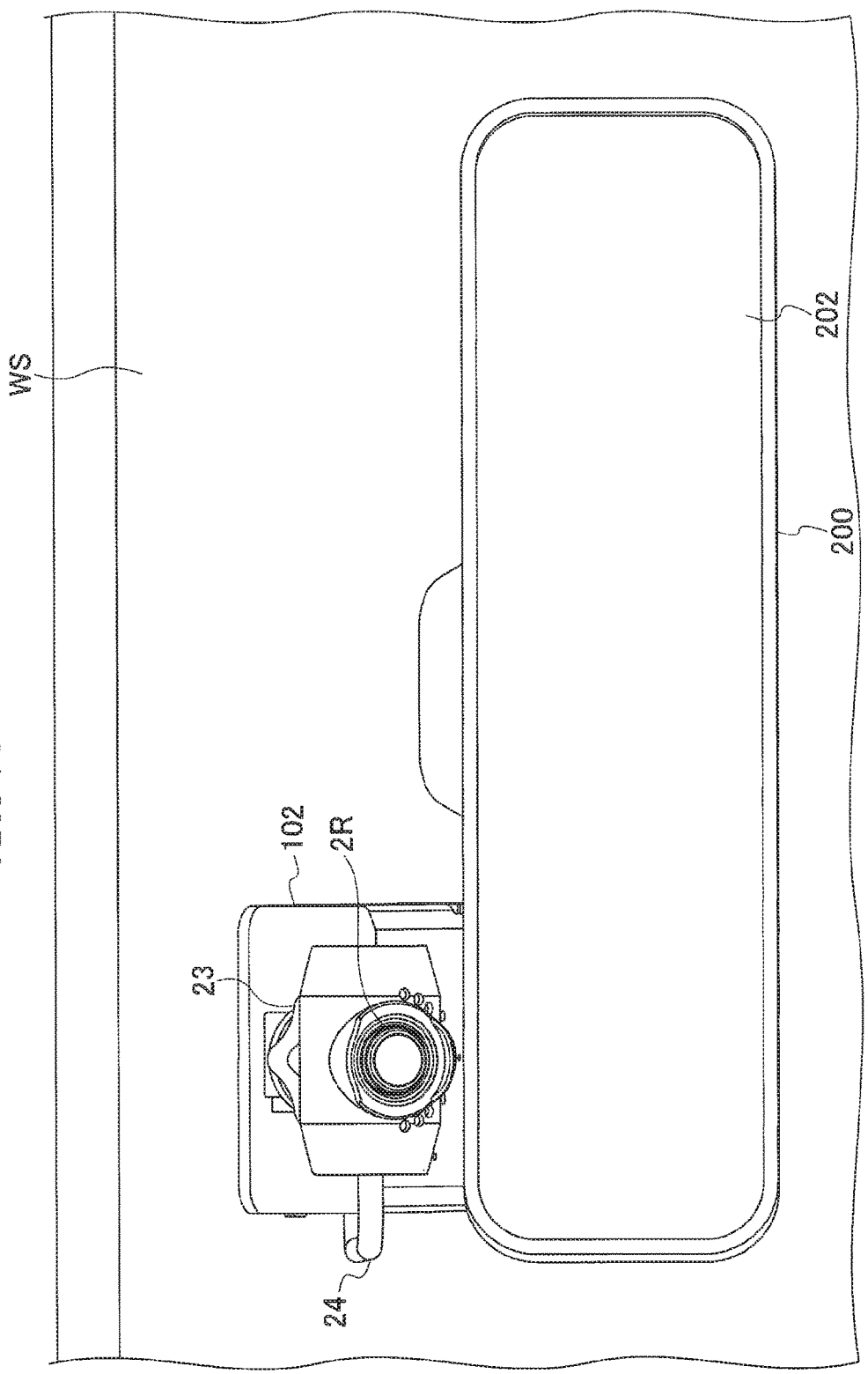
FIG. 10 is a plan view of the in-vehicle camera according to the second embodiment installed in the vehicle in the first state as viewed from the inside of the vehicle.

FIG. 10 shows the in-vehicle camera 102 attached in the state shown in FIG. 9 as viewed from the interior toward the rearview mirror 200. The rear imaging portion 2R is located above the rearview mirror 200.

The attachment 22a is used to hold the rear imaging portion 2R at a position higher than a mirror part 202 of the rearview mirror 200. The rear imaging portion 2R attached to the attachment 22a is positioned not to capture the rearview mirror 200.

Figure 11:
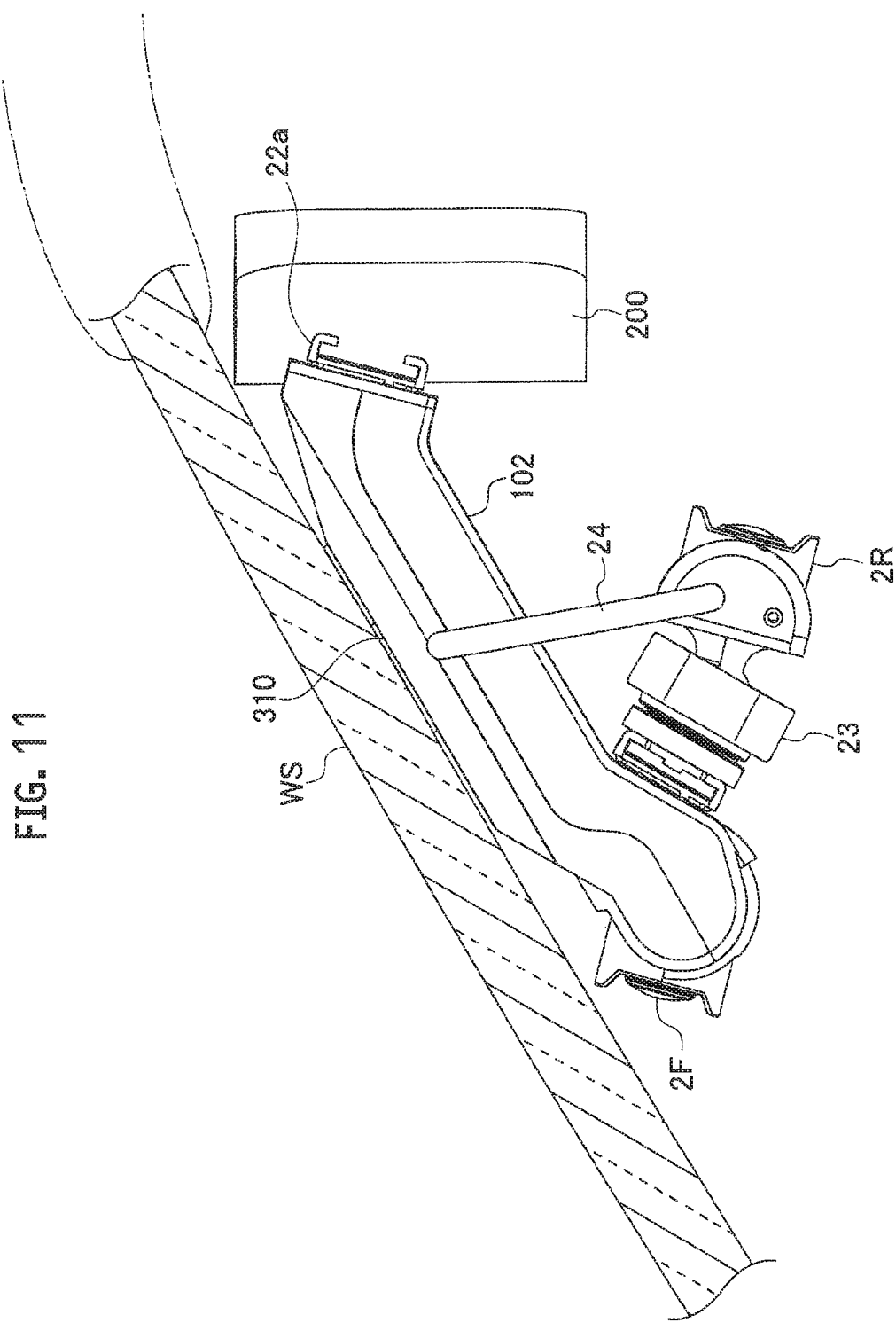
FIG. 11 is a side view of the in-vehicle camera according to the second embodiment installed in the vehicle in the second state.

The in-vehicle camera 102 is in the state shown in FIG. 8 when attached to a vehicle in which the region between the rearview mirror 200 and the roof of the vehicle is narrow. As shown in FIG. 11, the in-vehicle camera 102 is fixed to the inner surface of the windshield WS with the fixing portion 310. FIG. 11 also shows a cross section of the windshield WS at the position where the in-vehicle camera 102 is attached.

Figure 12:
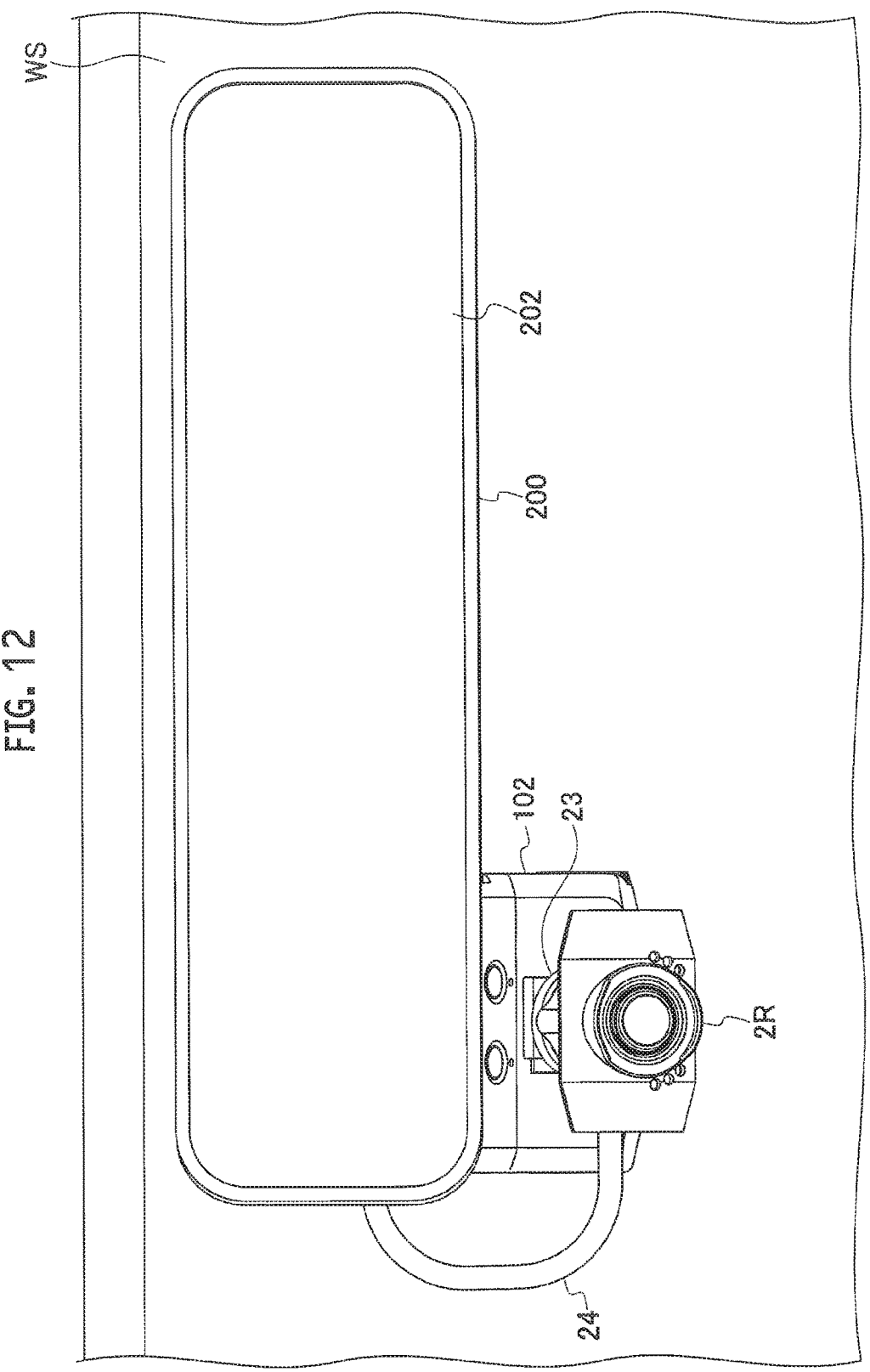
FIG. 12 is a plan view of the in-vehicle camera according to the second embodiment installed in the vehicle in the second state as viewed from the inside of the vehicle.

FIG. 12 shows the in-vehicle camera 102 attached in the state shown in FIG. 11 as viewed from the interior toward the rearview mirror 200. The rear imaging portion 2R is located below the rearview mirror 200.

The attachment 22b is used to hold the rear imaging portion 2R at a position lower than the mirror part 202 of the rearview mirror 200. The rear imaging portion 2R attached to the attachment 22b is positioned not to capture the rearview mirror 200.

As described above, the in-vehicle camera 102 according to the second embodiment can be installed to any type of vehicle whether the region between the rearview mirror 200 and the roof of the vehicle is wide or narrow.

Third Embodiment

An in-vehicle camera 103 according to the third embodiment is explained below with reference to FIG. 13 and FIG. 14. There is still another problem that an in-vehicle camera tends to be stolen. The third embodiment provides the in-vehicle camera 103 having an antitheft configuration. The same elements in FIG. 13 as those in FIG. 1 to FIG. 12 are indicated by the same reference numerals, and overlapping explanations thereof are not repeated below.

The in-vehicle camera 103 may have a particular configuration described below in addition to the configuration of the in-vehicle camera 101 according to the first embodiment. The in-vehicle camera 103 may have a particular configuration described below in addition to the configuration of the in-vehicle camera 102 according to the second embodiment. The in-vehicle camera 103 may have a particular configuration described below instead of having the configuration of the in-vehicle camera 101 or 102 according to the first or second embodiment.

Figure 13:
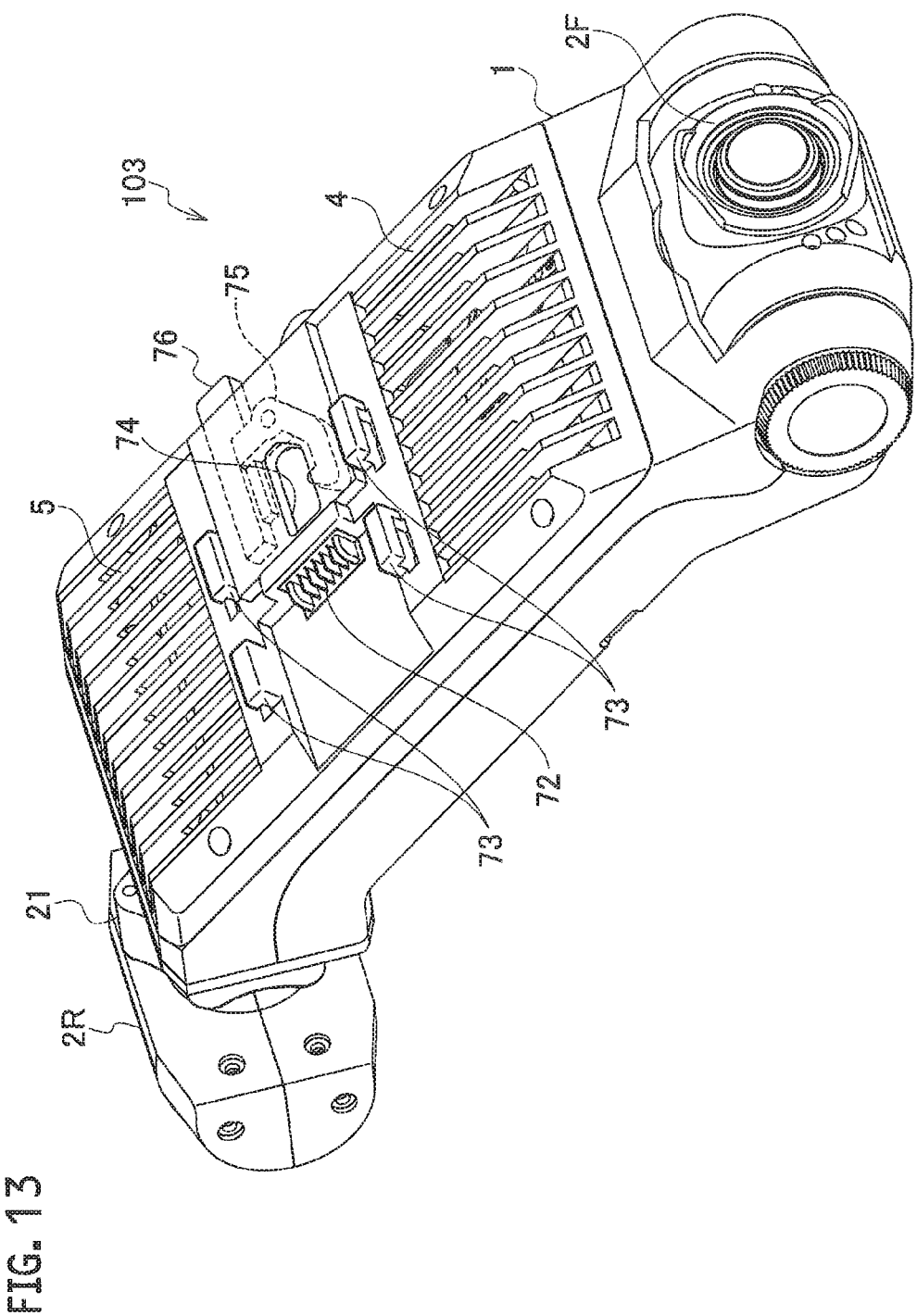
FIG. 13 is a perspective view of an in-vehicle camera on the upper side according to the third embodiment.
Figure 14:
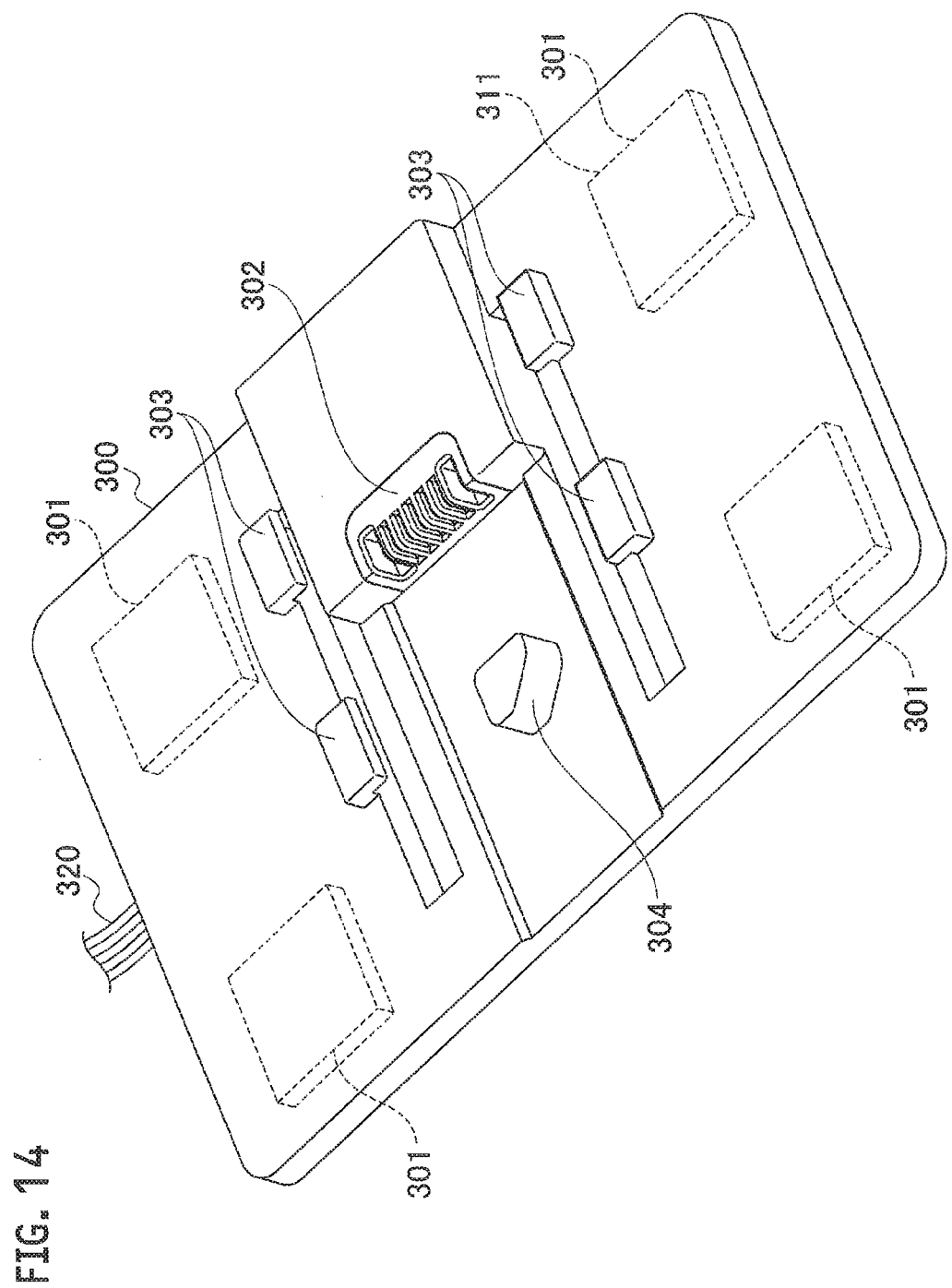
FIG. 14 is a perspective view of a cradle used together with the in-vehicle camera according to the third embodiment.

The in-vehicle camera 103 shown in FIG. 13 is detachably connected to a cradle 300 shown in FIG. 14. FIG. 13 is illustrated with an example in which the in-vehicle camera 103 includes the detachable rear imaging portion 2R as in the case of the in-vehicle camera 102.

The cradle 300 shown in FIG. 14 is configured such that the cradle 300 is provided, on the rear surface thereof, with double-sided adhesive tape 301 with which the cradle 300 is put on the inner surface of the windshield. FIG. 14 is illustrated with an example where the four pieces of double-sided adhesive tape 301 constitute a fixing portion 311 adhering to the windshield.

The cradle 300 includes, on the front surface thereof, a recessed connection terminal 302, engaged portions 303, and a projection 304 formed approximately into a triangular prism. Cables 320 connected to the connection terminal 302 are connected to a power source. The cradle 300 is put on the inner surface of the windshield with the fixing portion 311.

As shown in FIG. 13, the casing 1 of the in-vehicle camera 103 includes, on the upper surface thereof, a projecting connection terminal 72 coupled with the connection terminal 302, engaging portions 73 engaging with the engaged portions 303, and a recess 74 into which the projection 304 is fitted.

When the in-vehicle camera 103 is slid along the cradle 300 in a state where the projection 304 is fitted to the edge of the recess 74, the connection terminal 72 is connected to the connection terminal 302, and the engaging portions 73 engage with the engaged portions 303 so that the in-vehicle camera 103 is attached to the cradle 300. A hook-shaped lock lever 75 then engages with the projection 304 so that the in-vehicle camera 103 is fixed to the cradle 300. Accordingly, power is supplied to the in-vehicle camera 103 from the connection terminal 72 to operate the in-vehicle camera 103.

Once a release lever 76 is pushed, the engagement of the lock lever 75 with the projection 304 is released so as to remove the in-vehicle camera 103 from the cradle 300.

The in-vehicle camera 103 according to the third embodiment can easily be attached to and removed from the cradle 300. The in-vehicle camera 103 can be protected against theft by being removed from the cradle 300.

Although the present embodiment exemplified the case where the cradle 300 is a component separated from the in-vehicle camera 103, the in-vehicle camera 103 itself may include the casing 1 and the cradle 300 together.

Fourth Embodiment

An in-vehicle camera 104 according to the fourth embodiment is explained below with reference to FIG. 15 and FIG. 16. The fourth embodiment provides the in-vehicle camera 104 capable of blocking direct sunlight to prevent an increase in temperature. The same elements in FIG. 15 and FIG. 16 as those in FIG. 1 to FIG. 14 are indicated by the same reference numerals, and overlapping explanations thereof are not repeated below.

The in-vehicle camera 104 may have a particular configuration described below in addition to the configuration of the in-vehicle camera 101 according to the first embodiment. The in-vehicle camera 104 may have a particular configuration described below in addition to the configuration of the in-vehicle camera 102 according to the second embodiment.

The in-vehicle camera 104 may have a particular configuration described below in addition to the configuration of the in-vehicle camera 103 according to the third embodiment. The in-vehicle camera 104 may have a particular configuration described below instead of having the configuration of the in-vehicle camera 101, 102 or 103 according to the first, second or third embodiment.

Figure 15:
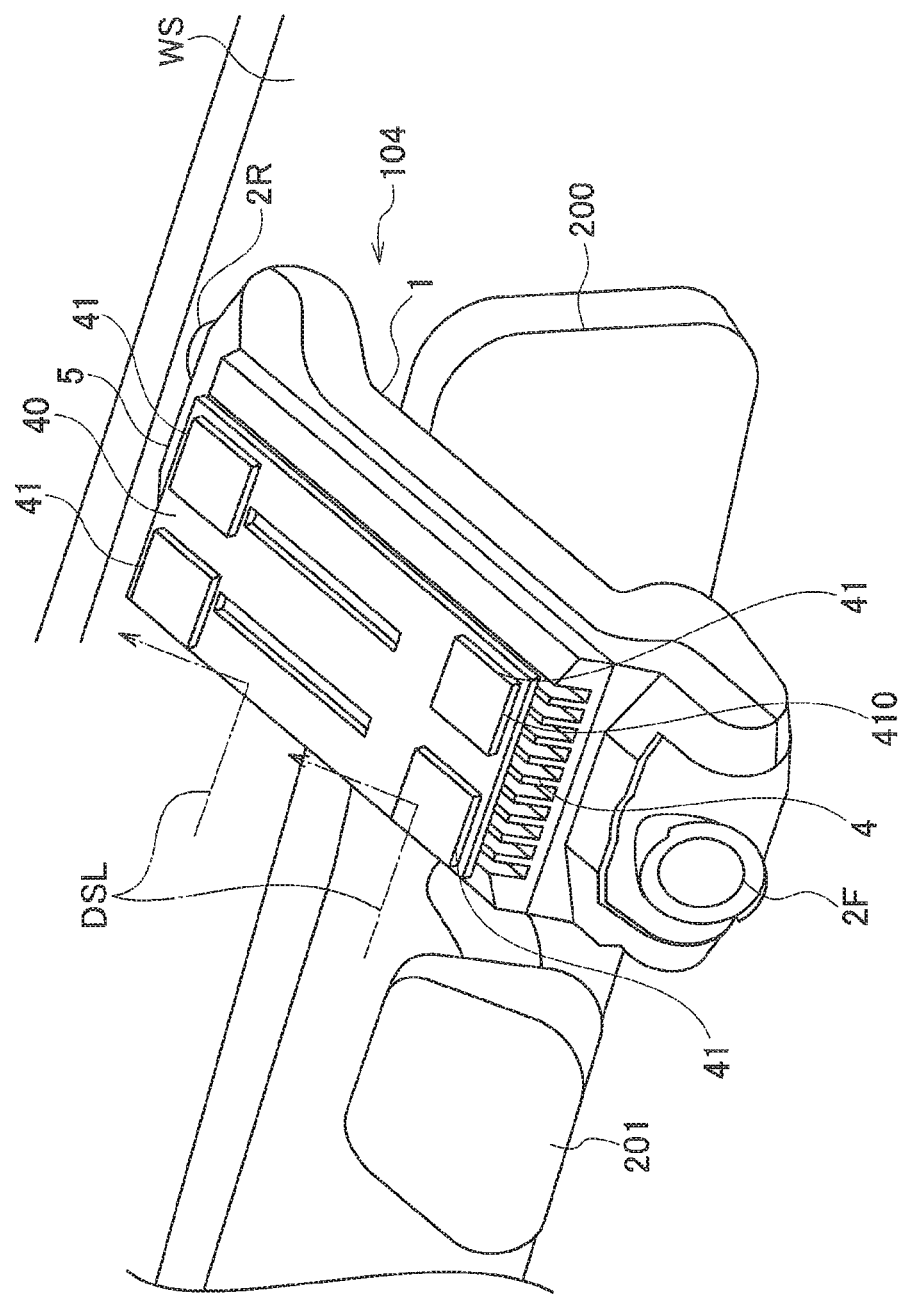
FIG. 15 is a perspective view of an in-vehicle camera according to a fourth embodiment installed in a vehicle as viewed from the outside toward the inside of the vehicle.
Figure 16:
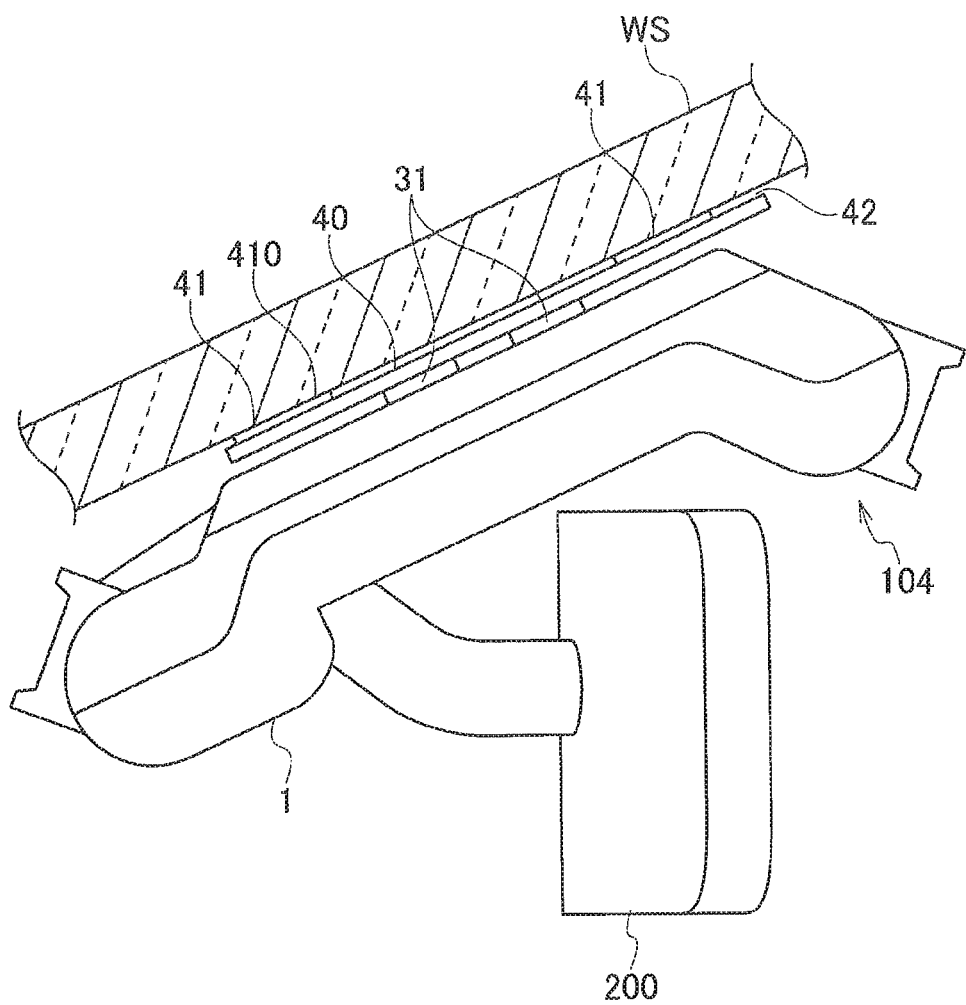
FIG. 16 is a side view of the in-vehicle camera according to the fourth embodiment installed in the vehicle.

As shown in FIG. 15 and FIG. 16, the in-vehicle camera 104 has a configuration in which an attachment 40 is put on the upper surface of the casing 1 to be integrated together. The casing 1 is put on the rear surface of the attachment 40 with the double sided adhesive tape 31.

The attachment 40 is provided with double-sided adhesive tape 41 with which the in-vehicle camera 104 is put on the inner surface of the windshield of the vehicle. The four pieces of double-sided adhesive tape 41 constitute a fixing portion 410 adhering to the windshield. The in-vehicle camera 104 is put on the inner surface of the windshield with the fixing portion 410.

As shown in FIG. 15, the attachment 40 blocks part of direct sunlight DSL. As shown in FIG. 16, the double-sided adhesive tape 31 is interposed between the casing 1 and the attachment 40, and a gap 42 is provided between the attachment 40 and the inner surface of the windshield due to the double-sided adhesive tape 41. Therefore, a distance between the inner surface of the windshield and the casing 1 further increases so that heat is not easily transmitted to the casing 1.

When the attachment 40 is combined with the in-vehicle camera 103 according to the third embodiment to constitute the in-vehicle camera 104 according to the fourth embodiment, the in vehicle camera 103 may be put on the rear surface of the attachment 40 with, for example, double-sided adhesive tape.

The present invention is not limited to the respective embodiments described above, and various modifications and improvements can be made without departing from the scope of the present invention. The respective configurations according to the first to fourth embodiments may be combined as appropriate.

The first to fourth embodiments described above disclose in-vehicle cameras recited in the respective claims and further disclose the following in-vehicle cameras.

(1) An in-vehicle camera including:
a rear imaging portion configured to capture the interior or the rear side of a vehicle;
a casing including a plurality of attachments for holding the rear imaging portion at positions having different heights; and
a fixing portion configured to fix the casing to a predetermined position in the vehicle in a manner such that the casing is located in a space between a windshield and a rearview mirror in the vehicle.

(2) The in-vehicle camera according to item (1), wherein the attachments include an attachment located at a position where the rear imaging portion does not capture the rearview mirror.

(3) The in-vehicle camera according to item (1) or (2), wherein the attachments include an attachment for holding the rear imaging portion at a position lower than a mirror part of the rearview mirror.

(4) The in-vehicle camera according to any one of items (1) to (3), wherein the attachments include an attachment for holding the rear imaging portion at a position higher than the mirror part of the rearview mirror.

(5) The in-vehicle camera according to any one of items (1) to (4) further including a front imaging portion configured to capture the front side of the vehicle.

(6) An in-vehicle camera including:
an imaging portion;
a casing housing the imaging portion; and
a cradle fixed to the inner surface of a windshield of a vehicle,
wherein the cradle includes an engaged portion engaged with the casing, a projection, and a first connection terminal electrically connected to the vehicle, and
the casing includes an engaging portion engaging with the engaged portion, a recess in which the projection is fitted, a lock lever engaging with the projection fitted in the recess so as to fix the casing to the cradle, a release lever for releasing the engagement of the lock lever with the projection, and a second connection terminal electrically connected to the first connection terminal with the engaging portion engaging with the engaged portion.

(7) The in-vehicle camera according to item (6), wherein the in-vehicle camera is supplied with power from the second connection terminal.

(8) The in-vehicle camera according to item (6) or (7), wherein the imaging portion includes:
a front imaging portion configured to capture the front side of the vehicle; and
a rear imaging portion configured to capture the interior or the rear side of the vehicle.

The present invention can be applied to a drive recorder having recording and reproducing functions or an imaging device for imaging the inside or outside of the vehicle without recording or reproducing functions.

What is claimed is:
1. An in-vehicle camera comprising:
a front imaging portion configured to capture a front side of a vehicle;
a rear imaging portion configured to capture an interior or a rear side of the vehicle;
a casing housing the front imaging portion and the rear imaging portion;
a heat sink located between the front imaging portion and the rear imaging portion in the casing to radiate heat inside the casing;
a fixing portion located on an outer surface of the casing and between a first end and a second end of the heat sink and separated from the heat sink to fix the casing to an inner surface of a windshield of the vehicle;
an air intake located adjacent to the fixing portion at the first end side of the heat sink to be open toward the heat sink; and
an air outlet located adjacent to the fixing portion at the second end side of the heat sink to be open toward the heat sink while facing the air intake with the fixing portion interposed therebetween,
wherein the fixing portion is configured to fix the in-vehicle camera to the inner surface of the windshield, in such a manner that one of the front imaging portion and the rear imaging portion is located at an upper side of the windshield, and the other is located at a lower side of the windshield, the lower side being the first end side of the heat sink, and the upper side being the second end side of the heat sink,
and wherein an airflow, flowing from the lower side to the upper side enters the air intake, cools the heat sink while passing through the casing, and is discharged to an outside of the casing from the air outlet.

2. The in-vehicle camera according to claim 1, wherein:
the air intake takes in an airflow along the windshield, and
the air outlet discharges the airflow along the windshield of the vehicle.

3. The in-vehicle camera according to claim 1, wherein the heat sink includes a plurality of fins aligned in a direction parallel to a line connecting the air intake to the air outlet.

* * * * *